United States Patent
Froehlich

[19]

[11] Patent Number: 6,149,303
[45] Date of Patent: Nov. 21, 2000

[54] PORTABLE LAWN BAG

[76] Inventor: Edward T. Froehlich, 12175 W. Black Oak Dr., Greenfield, Wis. 53328

[21] Appl. No.: 09/283,521

[22] Filed: Apr. 1, 1999

Related U.S. Application Data

[63] Continuation-in-part of application No. 09/074,286, May 7, 1998, abandoned.

[51] Int. Cl.[7] .............................. B65D 33/02; B65D 33/10
[52] U.S. Cl. .................................... 383/6; 248/99; 383/33
[58] Field of Search ........................... 383/33, 6; 248/99, 248/100, 101

[56]              References Cited

U.S. PATENT DOCUMENTS

| | | | |
|---|---|---|---|
| 3,604,677 | 9/1971 | Gits | 248/97 |
| 3,697,030 | 10/1972 | Schultz | 248/101 |
| 3,744,081 | 7/1973 | Miller | 248/101 |
| 4,023,842 | 5/1977 | Harvey | 248/99 |
| 4,069,993 | 1/1978 | Shanks | 248/97 |
| 4,299,365 | 11/1981 | Battle | 248/99 |
| 4,312,489 | 1/1982 | Paetzold | 248/97 |
| 4,805,858 | 2/1989 | Taylor | 248/99 |
| 5,014,944 | 5/1991 | Malik et al. | 248/99 |
| 5,255,982 | 10/1993 | Zimmer | 383/33 |
| 5,570,862 | 11/1996 | Nugent | 248/97 |
| 5,738,315 | 4/1998 | Kent, Jr. | 248/97 |
| 5,967,469 | 10/1999 | Wade | 248/100 |

*Primary Examiner*—Stephen P. Garbe
*Attorney, Agent, or Firm*—Donald J. Ersler

[57]              ABSTRACT

A portable lawn bag includes a bag and a pair of stakes. The bag is preferably rectangular in shape with an opening substantially perpendicular to the ground. Two holes are formed at a first end to receive a first stake. Two holes are formed at a second end to receive a second stake. Each stake includes a handle portion disposed at a first end, an upstanding pin, and an offset portion which is disposed at substantially the second end. During set-up, the bag is laid with either the top or bottom on the ground. The second end of each stake is inserted through a bottom hole at each end of the bag. The stakes are forced into the ground with a combination of hand pressure applied to the handle and foot pressure applied to the offset portions until the offset portions clamp the bag against the ground. A top hole at each end is placed over the upstanding pin of each stake. The upstanding pin holds the bag open such that lawn debris may be raked therein. After the bag is filled, it may be transported by grasping the top and bottom handles together and then dragging or carrying thereof.

9 Claims, 6 Drawing Sheets

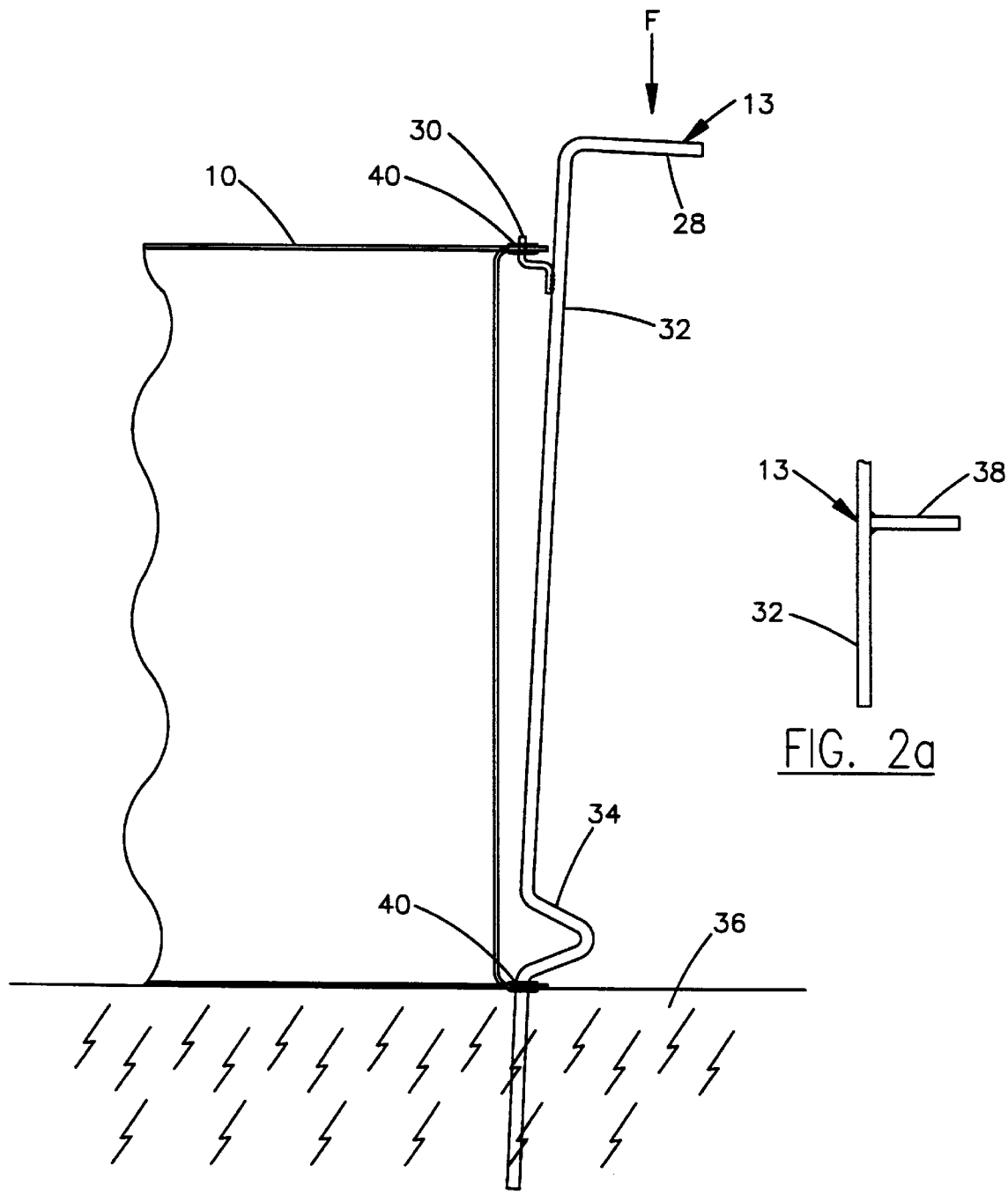

PORTABLE LAWN BAG

CROSS-REFERENCES TO RELATED APPLICATIONS

This is a continuation-in-part application of Ser. No. 09/074,286 filed on May 7, 1998 now abandoned.

BACKGROUND OF THE INVENTION

1. Field of the Invention

The present invention relates generally to lawn bags and more specifically to a portable lawn bag which allows a user to easily gather and transport lawn debris.

2. Discussion of the Prior Art

A problem frequently encountered with gathering fallen leaves, grass clippings, shrubbery branches, and the like is an easy way to load the lawn debris into a bag and then transport the bag to an area for disposal. Large plastic bags are the most common choice, but have some drawbacks. The large plastic bags must be loaded by hand. There is no means available for maintaining an opening in thereof for inserting lawn debris with a rake or other lawn implement. Most large plastic bags do not have carrying handles for transporting the bag. It is also possible for the large plastic bag to develop a rip during transport with the results of the contents falling out of the bag.

Accordingly, there is a clearly felt need in the art for a portable lawn bag which allows a user to easily fill the bag with lawn debris while using a rake, is constructed of a strong material that will not break during transport, and has a handle for transporting thereof.

SUMMARY OF THE INVENTION

The primary objective of the present invention is to provide a portable lawn bag which allows a user to easily fill the bag with lawn debris while using a rake, is constructed of a strong material that will not break during transport, and has a handle for transporting thereof.

According to the present invention, a portable lawn bag includes a bag and a pair of stakes. The bag is preferably rectangular in shape with an opening substantially perpendicular to the ground. A top handle is attached to a top of the bag at the opening. A bottom handle is attached to a bottom of the bag at the opening. Two holes are formed at a first end at the opening to receive a first stake. Two holes are formed at a second end at the opening to receive a second stake. Each stake includes a handle portion disposed at a first end, an upstanding pin disposed at substantially the first end, and an offset portion which is disposed at substantially the second end.

A second preferred embodiment of the stake includes a handle disposed at a first end, an upstanding pin portion which is disposed at an end of the handle, and an offset portion which is disposed at substantially the second end.

During set-up, the bag is laid with either the top or bottom on the ground. The second end of either stake is inserted through a bottom hole at each end of the bag. The stakes are forced into the ground with a combination of hand pressure applied to the handle and foot pressure applied to the offset until the offset portion clamps the bag against the ground. A top hole at each end is placed over the upstanding pin or upstanding pin portion of either stake. The upstanding pin or upstanding pin portion holds the bag open such that lawn debris may be raked therein. After the bag is filled, it may be transported by grasping the top and bottom handles together and then dragging or carrying thereof.

Accordingly, it is an object of the present invention to provide a portable lawn bag which has an opening which maintains its shape while raking lawn debris therein.

It is a further object of the present invention to provide a portable lawn bag which has handles for transporting thereof from one location to another.

It is yet a further object of the present invention to provide a portable lawn bag which may be easily emptied.

Finally, it is another object of the present invention to provide a portable lawn bag which is fabricated from a material which will not easily rip or tear during transport.

These and additional objects, advantages, features and benefits of the present invention will become apparent from the following specification.

BRIEF DESCRIPTION OF THE DRAWINGS

FIG. 2 is a side view of a stake inserted through the bottom and top holes of the bag and retained in the ground in accordance with the present invention;

FIG. 2a is a partial side view of an offset member which is attached to a stake in accordance with the present invention;

DETAILED DESCRIPTION OF THE PREFERRED EMBODIMENTS

Figure 1:
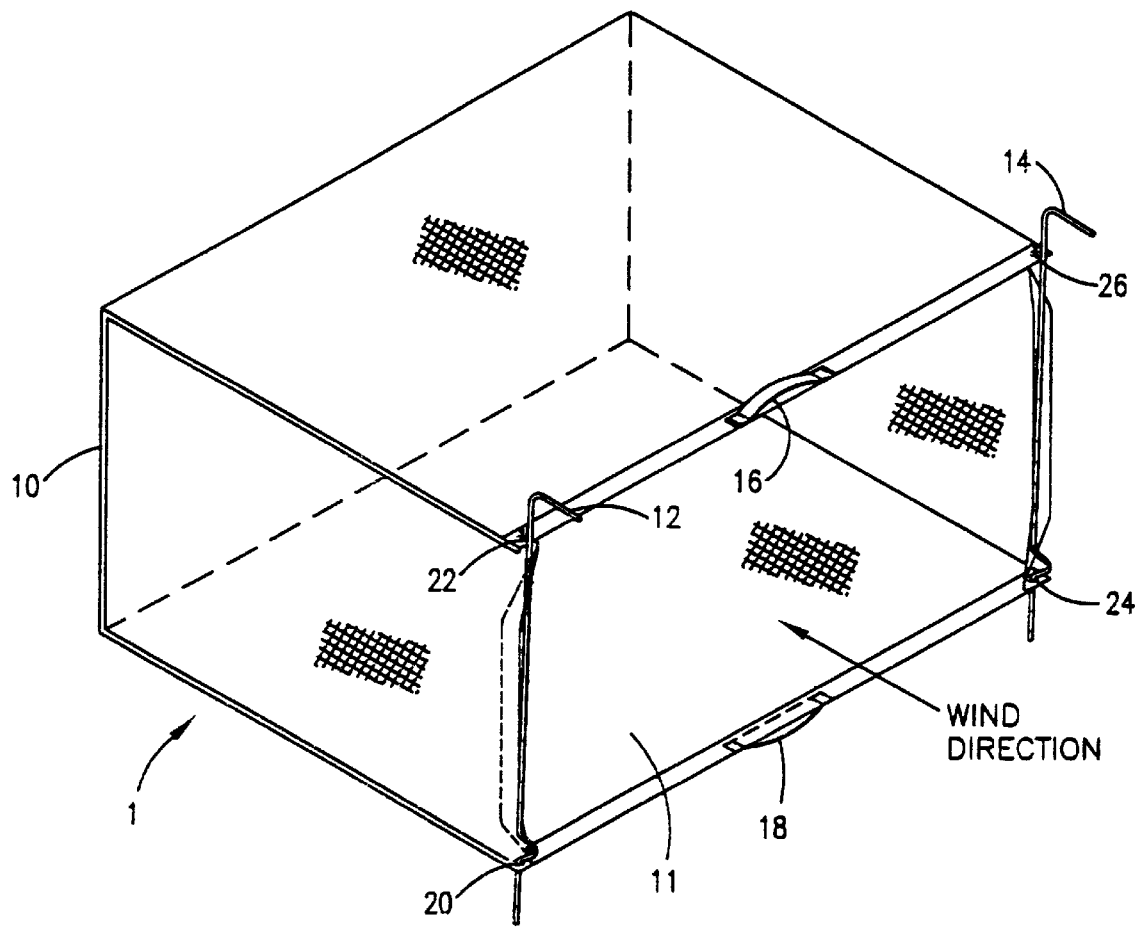
FIG. 1 is a perspective view of a portable lawn bag which is structured to be filled with lawn debris in accordance with the present invention.

With reference now to the drawings, and particularly to FIG. 1, there is shown a perspective view of a portable lawn bag 1. The portable lawn bag 1 includes a bag 10, a first stake 12, and a second stake 14. The dimensions, parameters, materials, processes, and shapes in this application are given by way of example and not by way of limitation. The bag 10 is preferably rectangular in shape with an opening 11 substantially perpendicular to the ground. The bag 10 is preferably fabricated from vinyl coated polyester mesh. The vinyl coating adds stiffness to bag 10 to help keep the back thereof open. The size of the mesh is preferably 11×11 size. The opening 11 is preferably 44 inches long by 24 inches high; the bag depth is preferably 35 inches. A non-mesh material may also be used.

Figure 5:
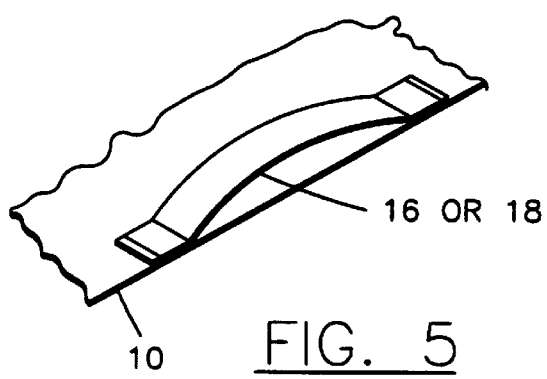
FIG. 5 is a perspective view of a handle attached to the bag in accordance with the present invention.

A first bottom hole 20 is formed in the bottom of the bag 10 at a first end. A first top hole 22 is formed in the top of the bag 10 at a first end. A second bottom hole 24 is formed in the bottom of the bag 10 at a second end. A second top hole 26 is formed in the top of the bag 10 at a second end. With reference to FIG. 5, a top handle 16 is attached to a top of the bag at the opening 11 with sewing, ultrasonic welding, or any suitable assembly process. A bottom handle 18 is attached to a bottom of the bag at the opening with sewing, ultrasonic welding, or any suitable assembly process. The handles are preferably fabricated from polypropylene webbing.

Figure 1A:
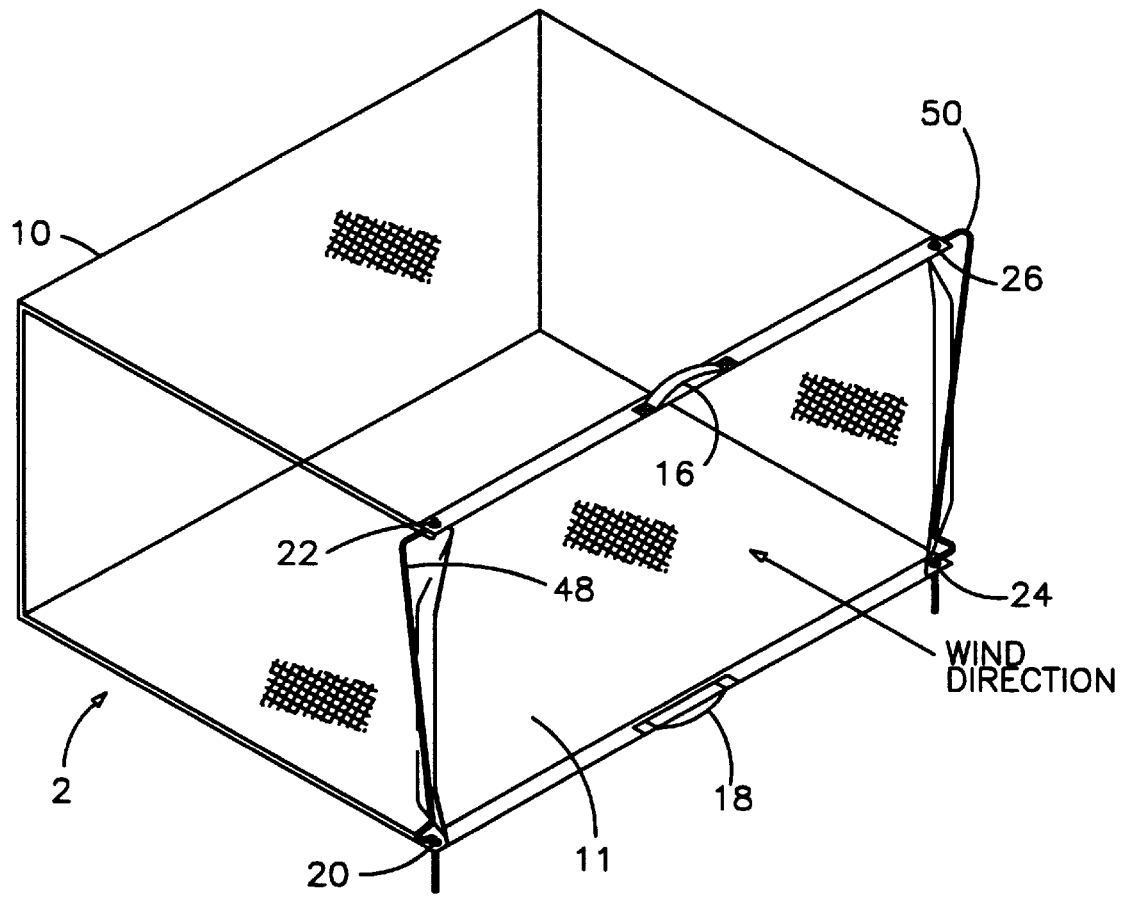
FIG. 1a is a perspective view of a portable lawn bag with a second preferred embodiment of the stake which is structured to be filled with lawn debris in accordance with the present invention.

FIG. 1a shows a perspective view of a portable lawn bag 2 utilizing a second preferred embodiment of a stake. The portable lawn bag 2 includes a first stake 48, a second stake 50, and the bag 10.

FIG. 2 shows that each stake 13 includes a handle portion 28 disposed at a first end, an upstanding pin 30 disposed at substantially the first end, and an offset portion 34 which is disposed at substantially the second end. The upstanding pin 30 is preferably welded to the length 32 of the stake 13 with any suitable welding process. The upstanding pin 30 could also be molded on to the length 32. The offset portion 34 may be formed by bending the length 32 outward or by fastening an offset member 38 to the length 32 of the stake 13 as shown in FIG. 2a. The offset member 38 should not be limited to the rod shown in FIG. 2a, but could be any design which facilitates the use of a foot to force the stake 13 into the ground. The stake 13 is preferably fabricated from steel and then treated to protect it from corrosion with some process such as galvanization. The stake 13 may also be fabricated from any material with the strength to be forced in the ground multiple times.

Figures 2B, 2C:
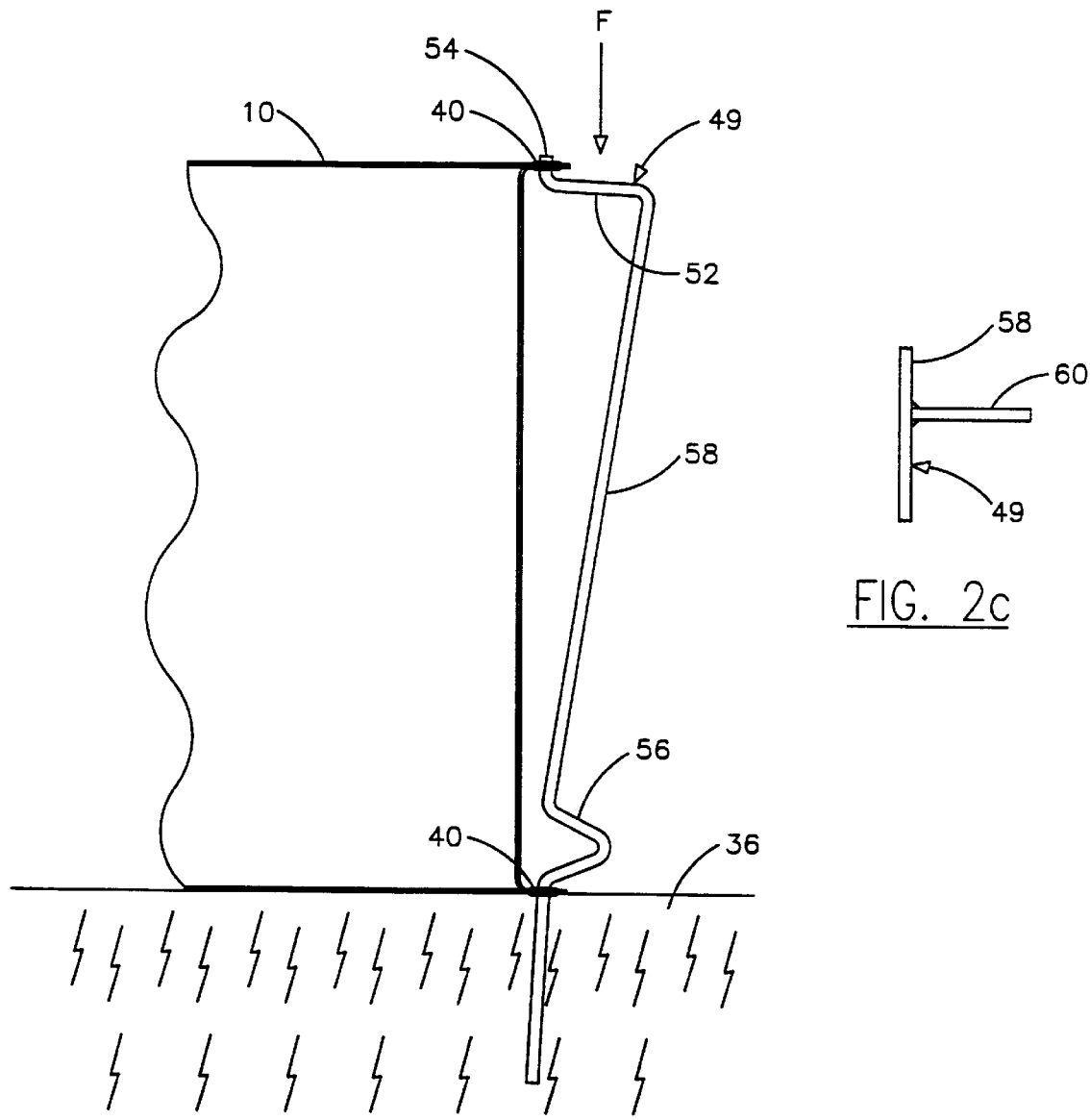
FIG. 2b is a side view of a second preferred embodiment of the stake inserted through the bottom and top holes of the bag and retained in the ground in accordance with the present invention.
FIG. 2c is a partial side view of an offset member which is attached to a second preferred embodiment of a stake in accordance with the present invention.

FIG. 2b shows that the second embodiment of each stake 49 includes a handle portion 52 disposed at a first end, an upstanding pin portion 54 extending upward from an end of the handle portion 52, and an offset portion 56 which is disposed at substantially the second end. The offset portion 56 may be formed by bending the length 58 outward or by fastening an offset member 60 to the length 58 of the stake 49 as shown in FIG. 2c. The offset member 60 should not be limited to the rod shown in FIG. 2c, but could be any design which facilitates the use of a foot to force the stake 49 into the ground. The stake 49 is preferably fabricated from a single piece of material. The stake 49 is also preferably fabricated from steel and then treated to protect it from corrosion with some process such as galvanization. The stake 49 may also be fabricated from any material with the strength to be forced in the ground multiple times.

Figure 3:
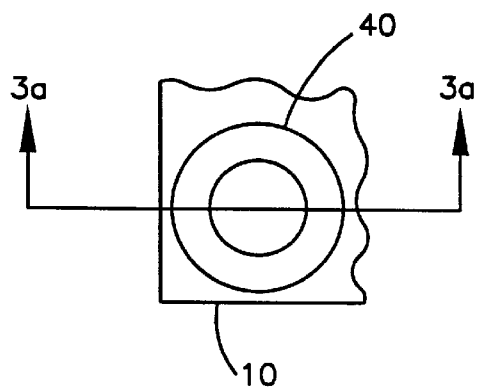
FIG. 3 is a top view of a reinforcement ring in accordance with the present invention.
Figure 3A:
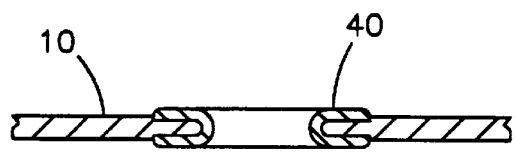
FIG. 3a is a cross sectional view of the reinforcement ring in accordance with the present invention.
Figure 4:
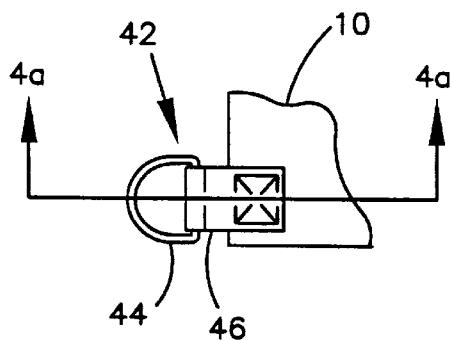
FIG. 4 is a top view of a D-ring in accordance with the present invention.
Figure 4A:
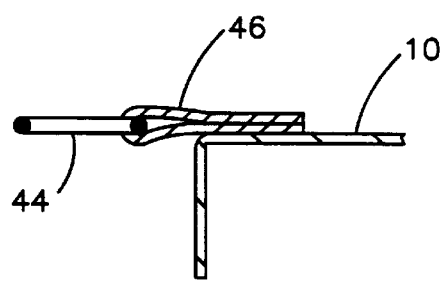
FIG. 4a is a cross sectional view of the D-ring in accordance with the present invention.

The holes in the bag 10 are preferably reinforced with a ring 40 which is pressed into the bag 10 as shown in FIGS. 3 and 3a. An alternative to the ring 40 is a D-ring assembly 42. The D-ring assembly includes a D-ring 44 and a retaining strap 46. The retaining strap 46 is looped around the D-ring 44 and attached to the bag 10 with sewing, ultrasonic welding, or any suitable assembly process. The inner diameter of either top or bottom rings 40 are the same to accommodate the top or bottom of the bag 10 being placed on the ground 36. The size of either top or bottom D-rings 44 are also the same to accommodate the top or bottom of the bag 10 being placed on the ground 36. The bag 10 is preferably symmetrical, therefore it does not matter whether the bottom of the bag 10 is placed on the ground or the top of the bag 10 is placed on the ground. The ring 40 and D-ring 40 are preferably fabricated from a material or treated with a process which prevents corrosion.

Set-up of the portable lawn bag 1 is implemented by laying the top or bottom of the bag 10 on the ground 36. The second end of the first stake 12 or 48 is inserted through the first bottom hole 20 and into the ground 36 by applying foot pressure to the offset portion 34 or 56 and hand pressure to the handle 28 or 52 until the offset portion 34 or 56 clamps the bag against the ground 36. The first top hole 22 of the bag 10 is then placed over the upstanding pin of the first stake 12 or 48. The bottom of the bag is then pulled tight across the ground with foot or hand pressure, and the second end of the second stake 14 or 50 is inserted through the second bottom hole 24 and forced into the ground 36.

The second stake 14 or 50 is preferably inserted at a slight outward angle with a combination of hand and foot pressure. The second top hole 26 of the bag is then placed over the upstanding pin of the second stake 14 or 50. The offset portion of each stake holds the bottom of the bag tightly and securely in the ground. It is preferable that the bag 10 be positioned relative to the wind such that the direction of the wind is perpendicular to the opening 11. Air pressure from the wind will help push the lawn debris into the bag 10 and the wind will exit through the bag 10 if it is fabricated from an open mesh construction. The upstanding pins of each stake hold the bag open such that lawn debris may be raked directly therein without the user having to use one hand to hold the bag 10 open.

Figure 6:
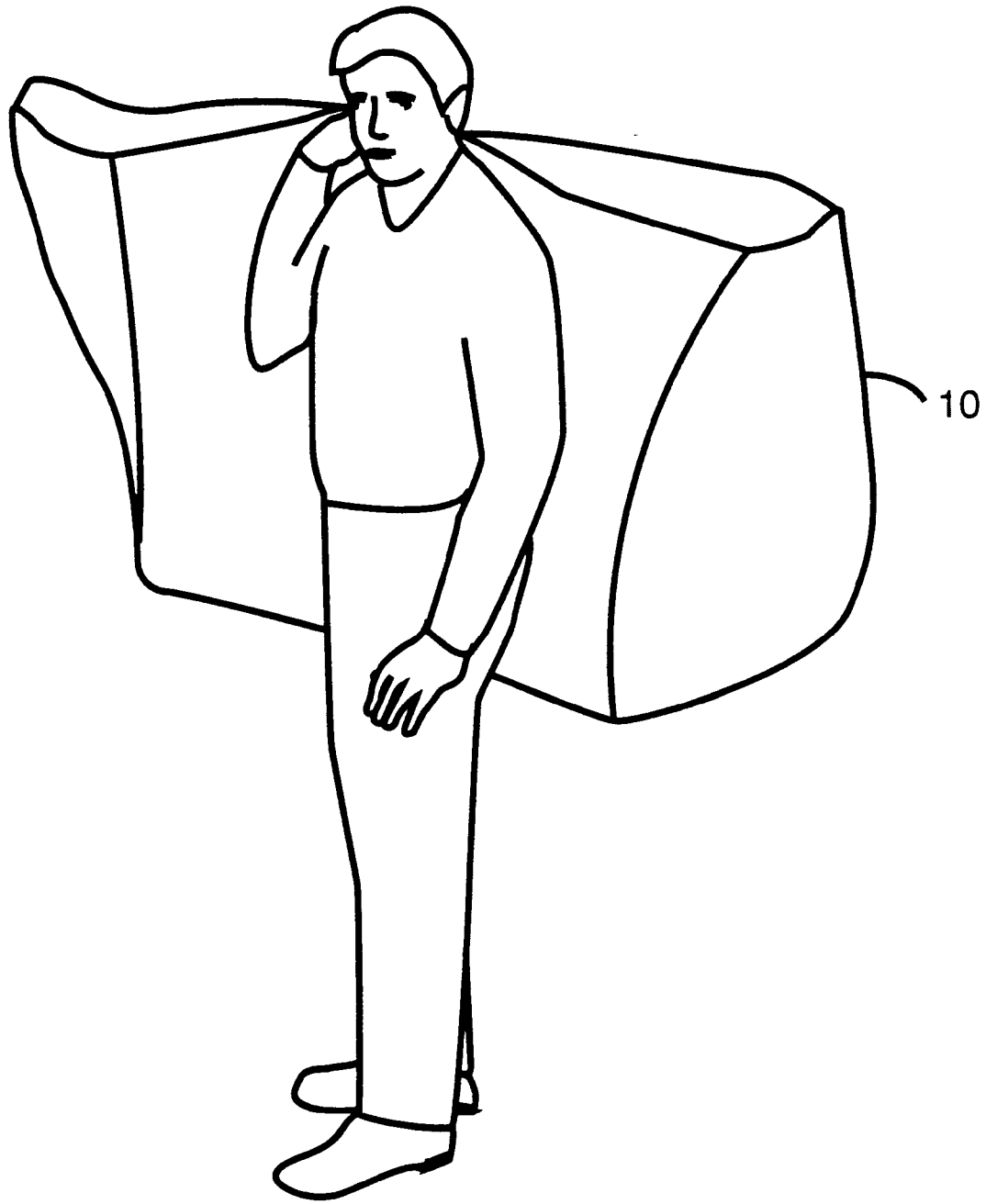
FIG. 6 is a perspective view of the bag being transported in accordance with the present invention.

After the bag 10 is filled or when thereof is to be moved, the top holes are lifted off the upstanding pins and then the stakes are pulled out of the ground with hand pressure against the handles. The bag 10 may be transported by grasping the top and bottom handles together and then dragging or carrying the bag 10 as shown in FIG. 6.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A portable lawn bag for gathering and transporting lawn debris comprising:

a bag having a top, a bottom, a first end and a second end, and a debris opening, said debris opening being defined by said top, said bottom, said first end, and said second end, a first bottom opening being formed adjacent said debris opening at said bottom and said first end thereof, a first top opening being formed adjacent said debris opening at said top and said first end thereof, a second bottom opening being formed adjacent said debris opening at said bottom and said second end thereof, a second top opening being formed adjacent said debris opening at said top and said second end thereof;

a pair of stakes, each one of said pair of stakes including a first end and a second end, a handle portion disposed at said first end, an upstanding pin portion extending upward from said handle portion, and an offset portion which is disposed at substantially the second end thereof;

a first one of said pair of stakes being inserted into said first bottom opening, a first upstanding pin portion being inserted into said first top opening; and a second one of said pair of stakes being inserted into said second bottom opening, a second upstanding pin portion being inserted into said second top opening, wherein said first and second upstanding pin portions supporting said top of said bag for the insertion of lawn debris.

2. The portable lawn bag for gathering and transporting lawn debris of claim 1, further comprising:

a top handle being attached to said top of said bag adjacent said debris opening, a bottom handle being attached to said bottom of said bag adjacent said debris opening.

3. The portable lawn bag for gathering and transporting lawn debris of claim 1, further comprising:

each of said first and second openings being holes, each of said holes being reinforced with a ring.

4. The portable lawn bag for gathering and transporting lawn debris of claim 1, further comprising:

each of said first and second openings being a D-ring assembly, said D-ring assembly including a D-ring and a retaining strap, said retaining strap being wrapped around said D-ring and attached to said bag.

5. The portable lawn bag for gathering and transporting lawn debris of claim 1, further comprising:

each of said stakes being fabricated from a single piece of material.

6. A portable lawn bag for gathering and transporting lawn debris comprising:

a bag having a top, a bottom, a first end and a second end, and a debris opening, said debris opening being defined by said top, said bottom, said first end, and said second end, a first bottom opening being formed adjacent said debris opening at said bottom and said first end thereof, a first top opening being formed adjacent said debris opening at said top and said first end thereof, a second bottom opening being formed adjacent said debris opening at said bottom and said second end thereof, a second top opening being formed adjacent said debris opening at said top and said second end thereof;

a pair of stakes, each one of said pair of stakes including a first end and a second end, a handle portion disposed at a first end, an upstanding pin disposed at substantially the first end, and an offset portion which is disposed at substantially the second end thereof;

a first one of said pair of stakes being inserted into a first bottom opening, a first upstanding pin being inserted into said first top opening; and a second one of said pair of stakes being inserted into a second bottom opening, a second upstanding pin being inserted into said second upstanding pin, wherein said first and second upstanding pin portions supporting said top of said bag for the insertion of lawn debris.

7. The portable lawn bag for gathering and transporting lawn debris of claim 6, further comprising:

a top handle being attached to said top of said bag adjacent said debris opening, a bottom handle being attached to said bottom of said bag adjacent said debris opening.

8. The portable lawn bag for gathering and transporting lawn debris of claim 6, further comprising:

each of said first and second openings being holes, each of said holes being reinforced with a ring.

9. The portable lawn bag for gathering and transporting lawn debris of claim 6, further comprising:

each of said first and second openings being a D-ring assembly, said D-ring assembly including a D-ring and a retaining strap, said retaining strap being wrapped around said D-ring and attached to said bag.

* * * * *